Sept. 6, 1960  J. H. LEMELSON  2,951,419
REFLECTIVE DISPLAY DEVICE
Original Filed June 11, 1953

INVENTOR.
Jerome H. Lemelson
BY Fred C. Philpitt
his attorney

2,951,419

REFLECTIVE DISPLAY DEVICE

Jerome H. Lemelson, 239 High St., Perth Amboy, N.J.

Original application June 11, 1953, Ser. No. 360,954. Divided and this application Oct. 15, 1956, Ser. No. 616,089

8 Claims. (Cl. 88—82)

The present invention relates to reflecting devices, and in particular is concerned with display devices of the reflex-reflector type which appear, to an observer moving with a light source, to flash on and off, scintillate or change optical composition. This is a division of my copending application Serial No. 360,954, filed June 11, 1953, and entitled "Display Devices."

Reflex-reflecting devices are generally known in the art and have the characteristic of returning light to an observer or an observation point at or near the source of light which is directed toward the reflecting device. A typical reflex-reflector embodies a sheet having many thousands of minute optical lenses, usually in the form of spheres applied in front of a highly reflective surface. Light rays striking the reflex-reflector over a wide range of incident angles are focused by the spheres to a point in front of the highly reflective surface in back of the optical system, and then are returned through the spheres back to the moving source. Such reflex-reflector may be constructed to provide the necessary reflection over narrow or wide angles, depending upon the construction of the reflector. Included among the numerous patents and publications which disclose constructional details of typical reflex-reflectors are U.S. Patents Nos. 2,294,930, 2,326,634 and 2,592,882.

The characteristics of reflex-reflectors are such as to make them eminently suitable for use on highway signs, street signs, safety markers, advertising media, truck backs and the like. At night, the reflex characteristics are such that it will appear to an observer moving with a vehicle having its headlights beamed on the reflex-reflector that the reflex-reflector contains a light source. This optical phenomena continues until the vehicle has virtually passed the reflex-reflector and has its headlights beamed at approximately an angle of 90° with respect to the reflector.

It is broadly an object of the present invention to provide improved display devices of the reflex-reflector type making possible new and pronounced visual effects.

Despite the improved performance of reflex-reflectors in various warning, advertising and display devices, particularly when compared to conventional reflectors or more complicated internally illuminated devices, there exists the need to attain varied and different effects with devices operating on the reflex-reflector principle. Experience indicates that warning and display devices which are intermittently illuminated have a more pronounced effect and in general are more eye catching. Familiar to all motorists are blinker lights, the blinker road markers, and blinker curve devices warning which immediately attract the attention.

It is a further object of the present invention to provide display devices of the reflex type which intermittently exhibit changes in optical composition as the light source and the observer move relative to the device. Specifically, it is within the contemplation of the present invention to provide new and improved reflecting display devices which to the observer, appear to flash on and off, flicker, or present indications of different colors.

In accordance with an illustrative embodiment demonstrating features of the present invention, a reflecting device is provided for use with a moving source of light which includes a transparent body having a lens thereon or associated therewith which is adapted to converge light from the moving source into a number of discrete light beams. Reflex-reflecting means are associated with the transparent body and cooperate with the lens means, the reflex-reflecting means including plural reflex-reflecting surfaces which return the discrete light beams to an observation point adjacent the moving source, and further plural regions of different light reflectivity. The regions of different light reflectivity may be regions of total or partial light absorption, regions which are arranged to reflect light to regions other than those successively occupied by the moving observation point, and regions of different color-emitting properties. Advantageously, many varied effects may be obtained by structures which are simple and completely compatible with existing techniques for the manufacture of reflex-reflecting devices.

The above brief description, as well as further objects, features and advantages of the present invention will be best appreciated by reference to the following detailed description of a preferred embodiment, when taken in conjunction with the accompanying drawings, wherein.

Figures 1, 2:
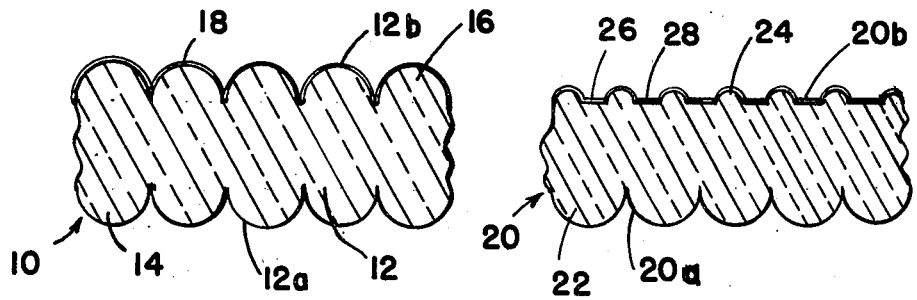
Fig. 1 is a sectional view of a first embodiment of the present invention capable of producing an "on-off" display.
Fig. 2 is a sectional view of a second embodiment of the present invention likewise capable of producing an "on-off" display.

Referring now specifically to the drawings, there is shown in Fig. 1 a display device, which has generally been designated by the reference numeral 10. The device 10 embodies a transparent panel 12 which is adapted to receive light from a moving source (i.e., a vehicle with the head lamps beamed on the sheet or panel 12). The front and rear surfaces 12a, 12b of the transparent sheet or panel 10 are formed with integral convex lens-like formations, generally designated by the reference numerals 14, 16 which comprise semi-spherical or semi-cylindrical ribs integral with the light transmitting panel, which may be fabricated from glass or plastic. The rear surface 12b of the panel 12 is coated with a reflecting layer 18 which is arranged to redirect the light rays impinging thereon back through the front surface 12a of the panel 12 and through the media to the external moving light source. The reflective layer or coating 18 may include a thin vacuum deposit of aluminum metallized onto the panel in accordance with well known vapor techniques. If desired, a protective coating (not shown) of plastic or other similar material may be applied over the reflective layer 18 to prevent the same from being rubbed off, marred, or otherwise affected. The relative sizes, shapes and spacing of the projections or lenticular formations 14, 16 on opposite surfaces of the panel 10 will determine the visual effect to the observer at the moving source of light. The relative sizes of the projections or lens formations 14, 16 is arbitrary and will be determined by the several optical parameters which effect the operation of the conventional reflex-reflector. For example the projections 14, 16 may be uniformly spaced and arranged in alignment with respect to each other to give a total flashing on and off effect; or may be arranged in regular spacings to give a flickering or rolling reflection to a light beam entering the front surface 12a. Many variations will occur to those skilled in the art when working with a panel constructed in accordance with the showing of Fig. 1.

In Fig. 2 there is shown in section a further form of the present invention which includes a transparent panel or sheet 20 having relatively large and essentially semicylindrical or semi-spherical formations 22 on the front face 20a thereof. On the rear face 20b of the panel or sheet, there is provided smaller similarly-shaped formations or projections 24 which are disposed in a spaced apart series. The formations 24 will be either semicylindrical or semi-spherical depending upon the configuration of the formations 22. The series of projections 24 on the rear surface are separated by flat surfaces, one of which has been designated by the reference numeral 26. The entire rear surface 20b is covered with a reflective coating, which has been generally designated by the reference character 28, which coating may be applied in the manner previously described.

When light enters the transparent sheet 20 through the front surface 20a thereof at any given angle, the respective lens-like formations or lenticules 22 on the front face converge into a number of discrete bands and focus each band or bundle of light rays within the transparent sheet at the focal point or focal line of the lens like formation. The light then diverges until it strikes the reflective rear surface 20b of the panel on which surface there are spaced regions 24 which are adapted to reflect and refocus the discrete light bundle or bands and return said light bundles or bands to an observation point or an observer adjacent the source of light. As the angle of incidence of the beam changes (i.e., in response to movement of the source), the light is focused by the lens-like formations 22 onto the flat bands 26 which are of different light reflectivity and do not direct the light back to the moving source. In the illustrative embodiment, the bands 26 are of a different radius of curvature and accordingly will either partly absorb or totally absorb light incidence thereon and preclude return of the light to the source. Thus the unusual optical phenomena described herein is obtained. By varying the spacing and dimensioning of the regions of different light reflectivity, and/or of the component parts of the reflex-reflector, varying effects may be obtained.

Figures 3, 4:
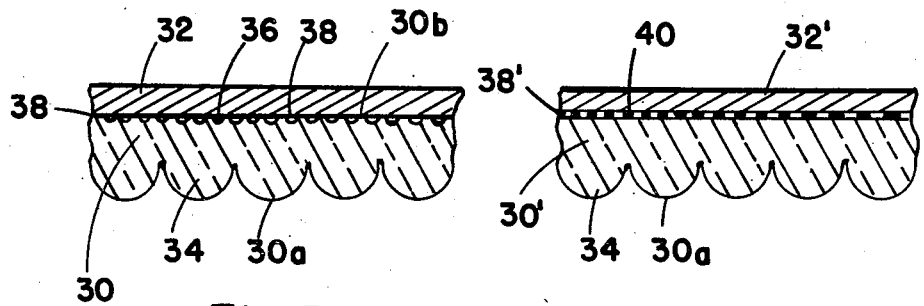
Fig. 3 is a sectional view of a third embodiment of the present invention which is arranged to produce a flickering or flashing display.
Fig. 4 is a sectional view of a fourth embodiment of the present invention which is arranged to provide a flashing interrupted reflection and demonstrating further features of the invention.

In Fig. 3 there is shown in section a still further embodiment of the present invention which embodies two sheets or panels, respectively designated by the reference numerals 30, 32. The panels or sheets 30, 32 are assembled in confronting relation as will hereinafter be described. The panel or sheet 30 is of transparent plastic glass or the like and has its front face 30a formed with a number of lens-like formations or projections 34 which are effective to converge the light entering the panel into a number of discrete bands, as previously described. On the rear surface 30b of the light-transmitting panel 30, there are provided a number of regions 36 each having an irregular or translucent surface which absorb or scatter light projected thereon by the lens-like formations 34. Light absorption or scattering at the region 36 may be attained in any one of many ways including the formation of indentation or irregularities on the rear surface 30b. Further, it is within the contemplation of the invention to change the light reflecting properties of the regions 36 of the rear surface by rendering such regions opaque so that the light striking such regions is totally or partially absorbed. The rear panel 32 is a reflex-reflector, such as the commercially available reflect-reflecting sheeting sold under the trademark Scotchlite, which is a product of Minnesota Mining and Manufacturing Co. of St. Paul, Minnesota. Such a reflex-reflector is available in the form of sheets of a flexible resin backing having imbedded therein a multiplicity of glass spheres which operate as minute optical lenses to return light to its source from a highly reflective surface on the back of the sheeting. Other forms of commercially available reflex-reflectors are contemplated for use as the element 32 of the illustrative assembly in Fig. 3.

The operation of the device in Fig. 3 is similar to that described in conjunction with Figs. 1 and 2. If the lens-like projections or formations 34 are cylindrically shaped, the light will be focused as lines or bands at or near the interface between the confronting faces of sheets 30, 32. The reflex-reflective surface provided by the sheeting 32 will reflect the light back through the transparent panel 30 along the incident path to the source of light. Prescribed regions of the return light will be totally or partially absorbed or scattered in that they are subjected to the regions 36 of different light reflectivity. As the angle of incident light changes, the position of the light bands at the interface 38 shifts and eventually will fall onto the regions of different reflectivity from that of the reflex-reflector 32 resulting in the changed optical effect achieved by the present invention.

The embodiment of Fig. 4 includes a transparent sheet 30' similar to the sheet 30 of Fig. 3 and a reflex-reflector 32' similar to the reflex-reflector 32 illustrated in Fig. 3. However the regions of different light reflectivity in this embodiment are obtained by light-absorbing bands or grids 40 which are printed or otherwise applied to either of the confronting surfaces at the interface 38'. If the light-absorbing bands 40 are equi-spaced and essentially equal in width to the light bands provided at the interface by the front panel 30' a definite chopping of the reflected light is obtained as the angle of the incident beam changes relative to the assembly.

Figure 5:
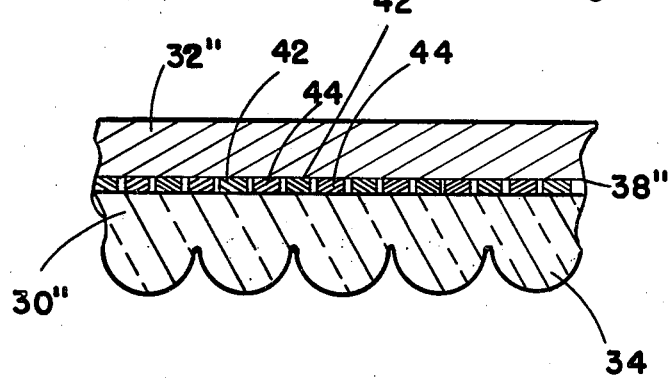
Fig. 5 is a sectional view of a fifth embodiment of the invention which is arranged to produce changing composition and color in accordance with further aspects of the present invention.

In Fig. 5 there is shown a still further variation of the general arrangement illustrated in Figs. 3 and 4. As before a transparent sheet 30'' is provided in assembly with a reflex-reflector 32'', the sheets meeting at an interface 38''. At the interface 38'' there is provided two groups of adjacent bands or strips, the bands of one group being designated by the reference numeral 42, and the bands of the other group being designated by the reference numeral 44. The bands of the respective groups are interdigitated and are of different color or light reflectivity. Most conveniently, the bands are formed by printing on the rear surface of the sheet 30 which is essentially flat. As the discrete bands of light from the sheet 30'' move with changing incident angles of light from the moving source, the bands of light shift from one group (i.e. 42) to the other group (i.e. 44) and thus the observer at one instant in time will see a pattern of one color and then a pattern of another color. By the principles demonstrated in accordance with Fig. 5 still further and different visual effects may be readily obtained.

A latitude of modification substitution and change is intended in the foregoing disclosure and it will be appreciated that features and concepts derived from the several figures may be employed in varying combinations to obtain many different visual effects. In the appended claims the term "different light reflectivity" is intended to include total or partial light absorption, scattering of light at an angle other than that which would direct the light back to the point of observation or the light source, and regions or areas of different color. In some instances some features of the invention will be used without a corresponding use of other features. It is intended that the appended claims be construed broadly and in a manner consistent with the spirit and scope of the disclosure herein.

I claim:

1. An improved multipatterned reflecting device which is characterized by its ability to cause a reflected light beam to systematically vary in appearance as a light source is moved across the field of the device, which comprises in combination:

(a) a transparent and relatively thin sheet of material having a front face composed of a plurality of parallel cylindrically shaped lenses which are adapted to focus incident light into a plurality of discrete light beams, (b) a pattern disposed behind the rear face of said transparent sheet, said pattern consisting of a plurality of parallel bands including a first array of spaced bands of material no greater than the diameter of said parallel cylindrically shaped lenses and being repetitive in arrangement, said bands of material being interposed between a second array of spaced band areas having dissimilar light transmitting properties than the light transmitting properties of the material of said first array of bands, (c) a reflex-reflector means containing a plurality of reflex-reflecting surfaces positioned with its front face directly behind said pattern, and (d) said pattern serving to divide incident light beams into a plurality of discrete reflected parallel beams of varying reflected intensities, the comparative intensities being augmented in contrast by said reflex-reflector means.

2. The reflecting device of claim 1 wherein said pattern consists of at least one layer of light absorbing material disposed in the form of a pattern between and adjacent to the rear face of said transparent sheet and the front face of said reflex-reflector means.

3. The reflecting device of claim 2 wherein said pattern comprises spaced-apart opaque strips of light absorbing material.

4. The reflecting device of claim 2 wherein said contrasting light absorbing areas are of different colors.

5. The reflecting device of claim 1 wherein said pattern comprises a layer of material having contrasting translucent light absorbing areas.

6. The reflecting device of claim 1 wherein said pattern comprises contrasting light absorbing areas, said areas being disposed in spaced-apart elongated strips, the direction of elongation being parallel to the axes of the cylindrically shaped lenses of said transparent face.

7. The reflecting device of claim 1 wherein said pattern comprises a light controlling layer consisting of spaced-apart light absorbing areas of contrasting colors.

8. The improved reflecting device of claim 1 wherein said lenses are substantially semi-cylindrical and join each other at substantially diametric points to thus form a corrugated surface, and said pattern forming means comprising a layer having contrasting light absorbing areas disposed in elongated strips, the direction of elongation being parallel to the axes of the corrugations of said transparent face.

References Cited in the file of this patent

UNITED STATES PATENTS

| | | |
|---|---|---|
| 1,150,374 | Kanolt | Aug. 17, 1915 |
| 1,989,553 | Kanolt | Jan. 29, 1935 |
| 1,992,608 | Deninson | Feb. 26, 1935 |
| 2,054,289 | Jackson | Sept. 15, 1936 |
| 2,121,132 | Ryder | June 21, 1938 |
| 2,121,566 | Leray | June 21, 1938 |
| 2,149,171 | Grote | Feb. 28, 1939 |
| 2,319,742 | Luce | May 18, 1943 |
| 2,351,034 | Gabor | June 13, 1944 |
| 2,379,702 | Gebhard | July 3, 1945 |
| 2,432,896 | Hotchner | Dec. 16, 1947 |

FOREIGN PATENTS

| | | |
|---|---|---|
| 54,371 | Denmark | Feb. 21, 1938 |